US008125970B2

(12) United States Patent
Gu et al.

(10) Patent No.: US 8,125,970 B2
(45) Date of Patent: Feb. 28, 2012

(54) RANGING METHOD FOR MEASURING DISTANCE BETWEEN A CENTRAL NODE AND AN EQUIPMENT NODE IN A BEACON WIRELESS PERSONAL AREA NETWORK

(75) Inventors: Ning Gu, Beijing (CN); Yong Guan, Beijing (CN); Liang Li, Beijing (CN)

(73) Assignee: Beijing Yudong Technology Development Ltd., Beijing (CN)

( * ) Notice: Subject to any disclaimer, the term of this patent is extended or adjusted under 35 U.S.C. 154(b) by 153 days.

(21) Appl. No.: 12/601,705

(22) PCT Filed: May 27, 2008

(86) PCT No.: PCT/CN2008/071106
§ 371 (c)(1),
(2), (4) Date: Apr. 8, 2010

(87) PCT Pub. No.: WO2008/145062
PCT Pub. Date: Dec. 4, 2008

(65) Prior Publication Data
US 2010/0202303 A1    Aug. 12, 2010

(30) Foreign Application Priority Data
May 31, 2007  (CN) .......................... 2007 1 0099879

(51) Int. Cl.
*H04W 4/00* (2009.01)
(52) U.S. Cl. ...................................................... 370/338
(58) Field of Classification Search .......... 370/328–350; 342/118, 450, 458
See application file for complete search history.

(56) References Cited

U.S. PATENT DOCUMENTS

| 7,042,868 B2 * | 5/2006 | Runkle et al. ................. 370/347 |
| 7,483,714 B2 * | 1/2009 | Tanaka et al. ................. 455/522 |
| 7,995,644 B2 * | 8/2011 | Sahinoglu et al. ............ 375/221 |
| 2005/0282558 A1 | 12/2005 | Choi et al. |
| 2006/0214848 A1 * | 9/2006 | Roberts ......................... 342/458 |

(Continued)

FOREIGN PATENT DOCUMENTS

CN    1189267 A    7/1998

(Continued)

OTHER PUBLICATIONS

Kwok et al, Ranging Mechanism, Preamble Generation, and Performance with IEEE 802.15.4a Low-Rate Low-Power UWB Systems, IEEE, 6 pages, 2006.*

(Continued)

*Primary Examiner* — Frank Duong
(74) *Attorney, Agent, or Firm* — Turocy & Watson, LLP (57) ABSTRACT

A ranging method is described for measuring distance between a central node and an equipment node in a beacon wireless personal area network. At the beginning stage, the central node calculates the parameters needed in the ranging operation and sends these parameters to the equipment nodes by beacon frames. Equipment nodes, in turn, send ranging frames at time slots assigned thereto according to the information received in the beacon frames. The central node calculates beacon frame flight time by recording the sending time and the arrival time of the ranging frame, and then calculates the distance between the central node and the equipment node. For nodes failing in the ranging procedure, the ranging parameters are changed according to failing reasons and the above procedure is repeated until a ranging result is received without failure.

7 Claims, 4 Drawing Sheets

U.S. PATENT DOCUMENTS

2011/0148714 A1 * 6/2011 Schantz et al. ............... 342/458

FOREIGN PATENT DOCUMENTS

| | | | |
|---|---|---|---|
| CN | 1749773 | A | 3/2006 |
| CN | 1953408 | A | 4/2007 |
| CN | 101064963 | A | 10/2007 |
| EP | 1763164 | A1 | 3/2007 |
| WO | 2006092772 | A1 | 9/2006 |

OTHER PUBLICATIONS

International Search Report mailed Sep. 4, 2008 for PCT Application Serial No. PCT/CN2008/071106, 4 pages.

* cited by examiner

RANGING METHOD FOR MEASURING DISTANCE BETWEEN A CENTRAL NODE AND AN EQUIPMENT NODE IN A BEACON WIRELESS PERSONAL AREA NETWORK

CROSS-REFERENCE TO RELATED APPLICATION

This application is a US national stage filing of Patent Cooperation Treaty (PCT) Application Serial No PCT/CN2008/071106 (WO 2008/145062), filed on May 27, 2008, which claims priority to Chinese Patent Application Serial No. 200710099879.X, filed on May 31, 2007, the entireties of both of which are incorporated herein by reference.

BACKGROUND OF THE INVENTION

1. Field of the Invention

The present invention relates to a ranging method for measuring distance between a central node and an equipment node in a beacon wireless personal area network.

2. Description of the Prior Art

Recently, wireless personal area network has become one of the popular research fields in the communication industry, and is attracting more and more attention in academic institutes. Its development is closely connected with the contribution and push of the Institute of Electrical and Electronics Engineers (IEEE). The IEEE defines multiple beacon wireless personal network standards including IEEE802.15.1 (Bluetooth), IEEE802.15.2 (supporting both wireless personal network and wireless local area network), IEEE802.15.3 (high speed wireless personal network), and IEEE802.15.4 (low speed wireless personal network supporting Zigbee). Among these, Bluetooth technology has developed to a relatively mature status, and is widely used in mobile communication equipments. High speed wireless personal network has not made a breakthrough due to certain issues in the technology and market but the IEEE802.15.4 low speed wireless personal network supporting Zigbee has become an optimal solution in the fields of industry, science and home because of its low power, long life, wide distribution, low cost, high reliability, safety and simple development process. Short-distance positioning in beacon wireless personal area network is one of the applications which can make full use of the advantages of super bandwidth technology among various short-distance ranging methods.

There are two kinds of wireless personal area networks: beacon personal area network and non-beacon wireless personal area network, depending on whether the central node thereof is sending a beacon frame or not. The ranging technology in the current beacon wireless personal area network estimates the distance between a cell transmitting end and a receiving end based on a variable LQI (link quality indicator). Chinese patent Application No. 200510114212.3 and 200610097637.2 use this method. LQI is calculated by a reference variable RSSI (Received Cell Strength Indicator), but RSSI is easily affected by the environment, and thus produces unreliable final results. Moreover, since the error of this method exceeds 1 meter, this method is not precise enough for a beacon wireless personal area networks with a radius about 100 meters. At the same time, this ranging method does not consider the network resource management when ranging multiple points. Thus the ranging method based on LQI is suitable for an area location with fewer points, which means the ranging method can only determine whether the object node is in the range defined by the transmitting end as center and the working distance as radius. However, for the accurate position of the equipment node, the method based on LQI is not precise and the result is also not reliable.

The radius of the beacon wireless personal area network is about 100 meters. High ranging precision is needed for use in beacon wireless personal area networks especially in military and science research applications where the precision is required to reach millimeter order. In addition, the nodes in beacon wireless personal area networks specializing in low power usually do not have constant external power supply. Thus, to prolong the life of the whole network, the ranging method and process thereof must consider the proper use of the network resource.

SUMMARY OF THE INVENTION

The present invention provides a ranging method that measures the distance between a central node and an equipment node in a beacon wireless personal area network, that increases the ranging precision and efficiency between nodes, that uses network resource properly to prolong the operating life of the whole network, and that provides a reliable and efficient solution to the ranging operation used in beacon wireless personal area networks.

According to the present invention, a ranging method for measuring a distance between a central node and an equipment node in a beacon wireless personal area network comprises: (1) a central node of a beacon wireless personal area network calculating a network active period parameter in a ranging request beacon frame according to an initial value of a ranging parameter, and setting a beacon frame sending period parameter equal to the network active period parameter; (2) the central node copying an address of each of equipment nodes from an equipment address list into a measuring address queue; (3) the central node copying the address from the measuring address queue into the ranging request beacon frame sent from the central node to the equipment nodes, and broadcasting the ranging request beacon frame to the equipment nodes, each of the equipment nodes in turn sending a ranging frame to the central node at an assigned time slot according to the address in the received ranging request beacon frame; (4) if the central node receives the ranging frame at a unit time slot, the central node recording an arrival time of the ranging frame from the equipment node, and the central node copying a new equipment address from the measuring address queue into the ranging request beacon frame until the assigned time slots of the equipment nodes end; (5) repeating steps (3) and (4) for completing a first ranging of each of the equipment nodes; and (6) calculating an average value of the arrival times, and getting the distance between the central node and the equipment node according to the average value and the initial value of the unit time slot corresponding to each of the arrival times.

DESCRIPTION OF THE PREFERRED EMBODIMENT

It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," and "coupled," and variations thereof herein are used broadly and encompass direct and indirect connections, couplings, and mountings.

Figure 1:
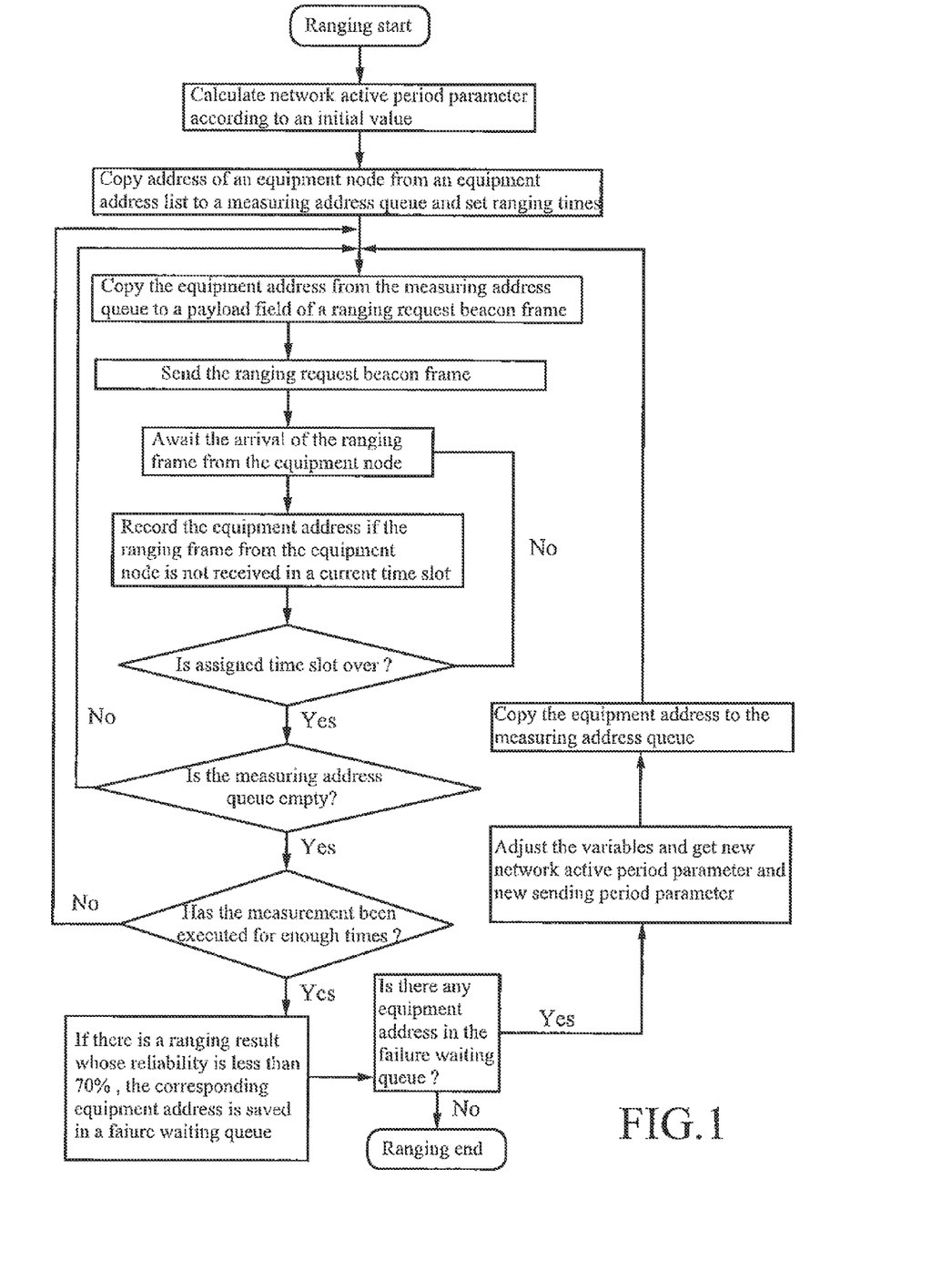
FIG. 1 is a flow chart of the preferred embodiment of a ranging method for measuring distance between a central node and an equipment node in a beacon wireless personal area network according to the present method.

The present invention provides a ranging method for measuring a distance between a central node and an equipment node in a beacon wireless personal area network, as illustrated in FIG. 1. Firstly, the central node in the beacon wireless personal area network calculates the network active period parameter in a ranging request beacon frame according to an initial value of preset ranging parameters, and sets a beacon frame sending period parameter equal to the network active period parameter. The central node copies an equipment address of an equipment node from an equipment address list to a measuring address queue, and sets the number of ranging times. The central node copies the equipment address in the measuring address queue into a ranging request beacon frame which is sent from the central node to the equipment node, and broadcasts the ranging request beacon frame to all equipment nodes. Each of the equipment nodes sends a ranging frame to the central node at the assigned time slot in order according to the equipment address in the received ranging request beacon frame. If the central node receives the ranging frame at the unit time slot, then the central node records the arrival time of the ranging frame from each of the equipment nodes. Otherwise, the central node stores the address of the equipment node corresponding to the unit time slot in a failure waiting queue. The central node copies the new equipment address in the measuring address queue into the ranging request beacon frame until all assigned time slots end. Repeat above steps to complete the multiple ranging of all of the equipment nodes. Based on a reliability assessment of the above ranging results sent by a transceiver chip in the beacon wireless personal area network, the central node stores the equipment address with a reliability lower than a preset threshold in the failure waiting queue, updates the ranging parameter in the ranging request beacon frame to get an updated network active period parameter and an updated beacon frame sending period parameter, and copies the equipment address in the failure waiting queue to the measuring address queue. Repeat above steps until there is no address in the failure waiting queue to get the arrival times of the ranging frames of all of the equipment nodes need to be measured. The central node calculates the average time of all arrival times, and get the distance between the central node and the equipment node according the average time and the initial value of the unit time slot corresponding to each of the arrival times. The distance between the central node and the equipment node is calculated using the equation, Distance between the central node and the equipment node=(average arrival time−initial value of the unit time slot)×speed of light.

The present invention is described in detail with reference to the drawings as follows.

In a beacon wireless personal area network, the central node, such as a coordinator, continuously sends the beacon frame in fixed time intervals. Other equipment nodes set a clock thereof to sync up with a clock of the coordinator after receiving the beacon frame. The beacon frame also contains other information to notify corresponding nodes to take action.

In the beacon wireless personal area network, the time interval between two beacon frames can be divided into an active period and an inactive period. The inactive period belongs to a hibernation period where all nodes directly get into dormant state to save power. In the active period, all nodes compete to transmit data so the communication between the central node and the equipment node only occurs in the active period. Moreover, the active period is divided into 16 time slots, and the formula of the active period is: 16×basic time slot×$2^{SO}$, and the formula of a sending period is: 16×basic time slot×$2^{BO}$, where the basic time slot is a relatively fixed value (60 adjustable cell periods). The network active period parameter and the beacon frame sending period parameter are decided by the central node when building a network and can be changed at any time. The relationship between the two parameters are: the network active period parameter≦the beacon frame sending period parameter<15. The network active period parameter determines the sending period of the beacon frame, and the beacon frame sending period parameter determines the time length of network communication.

Figure 2:
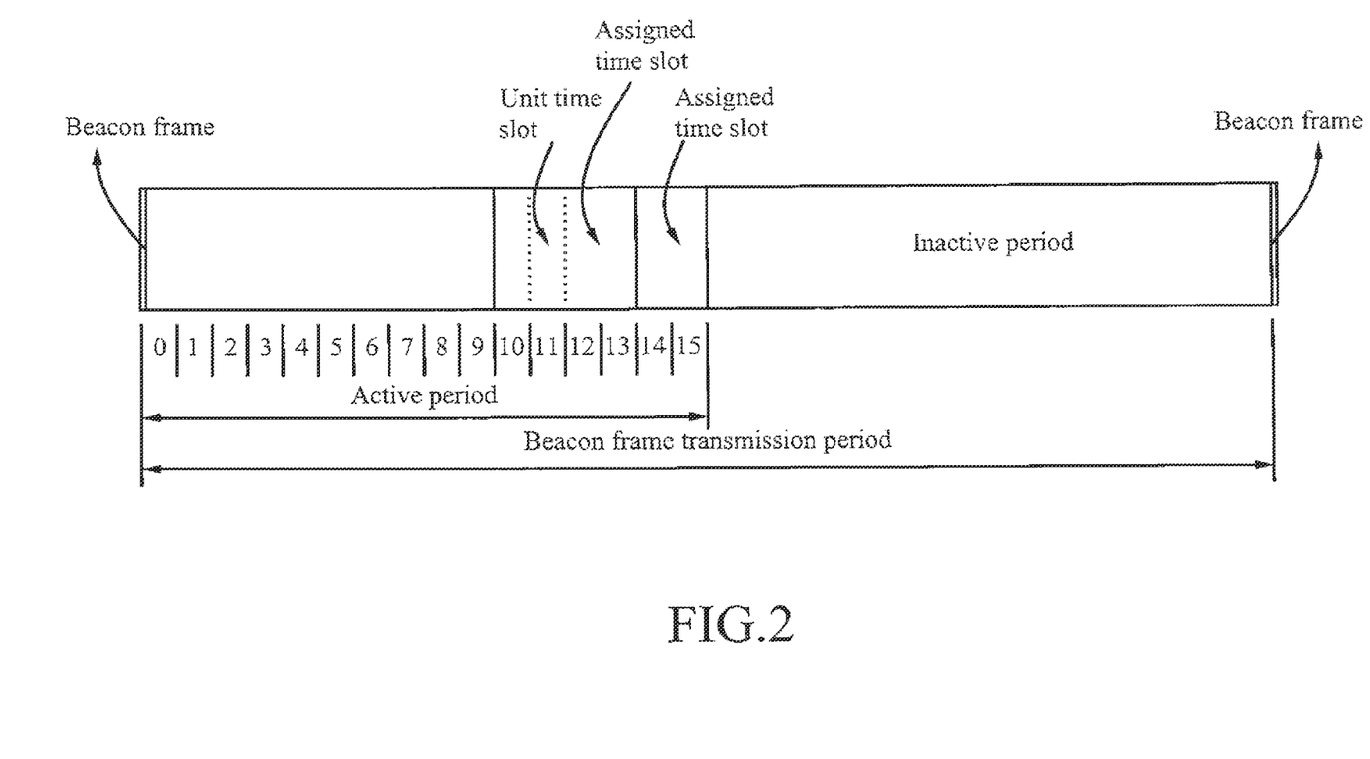
FIG. 2 is a structural diagram illustrating a beacon frame transmission period in a the beacon wireless personal area network.

Assigned time slot: starting from the last one of a 16 unit time slots in the active period, one unit time slot is used as a specified data communication time slot of one/some equipment node/s. One assigned time slot can occupy one or more unit time slots, but one assigned time slot can only be assigned to one equipment node. In an interval between two beacon frames, IEEE802.15.4b international standard supports seven assigned time slots at the most. The structural diagram of the active period, the inactive period, and the assigned time slot is illustrated in FIG. 2.

Header field: the beginning part of a physical layer data unit, the transceiver loads it in front of a data frame before sending data for data synchronization. The header field includes a physical layer data unit preamble field and a physical layer data delimiter field. The preamble field is for synchronization and includes 16, 64, 1024, or 4096 repeated basic preamble field cells. A delimiter field is an interval field between the physical layer data unit preamble field and the physical layer data unit payload field. Actually, the physical data unit payload field includes a lower level media access control layer data unit load header field and a media access control layer data unit payload field. The field hereinafter refers to the physical layer data unit field if there is no special instruction.

Average pulse sending frequency: numerically equal to pulse numbers in a single cell divided by a cell period. An average pulse sending frequency and a frame sending data rate determine the period of a single payload cell. The ranging frame contains the information illustrated in FIG. 3.

The central node calculates a proper network active period parameter and a beacon frame sending period parameter according to an initial average pulse sending frequency, a frame sending data rate, and a preamble field cell repeat times to guarantee the receiving of most ranging frames in one unit time slot, and two ranging frames from one equipment node in one assigned time slot (one ranging frame is transmitted in one unit time slot).

The calculation method of the network active period parameter and the beacon frame sending period parameter is described as follows:

According to the IEEE802.15.4a standard, since all fields are composed by cells, then the time from the equipment node sending the ranging frame to the central node receiving the ranging frame is:

$$\begin{aligned}T_{Send\ to\ Receive} &= \text{ranging frame flight time} + \text{ranging frame arrival time} \\&= \text{ranging frame flight time} + \text{header field time} + \\&\quad \text{length field time} + \text{payload field time} \\&= \text{raging frame flight time} + (\text{preamble field time} + \\&\quad \text{delimiter field time}) + \text{length field time} + \\&\quad \text{payload field time} \\&= \frac{100}{\text{speed of light}} + (\text{preamble field cell repeat times} + \\&\quad \text{delimiter field cell repeat times}) \times \\&\quad \text{preamble field cell period} + \\&\quad \text{length field time} + \text{payload field cell length} \times \\&\quad \text{payload field cell period}\end{aligned}$$

Figure 3:
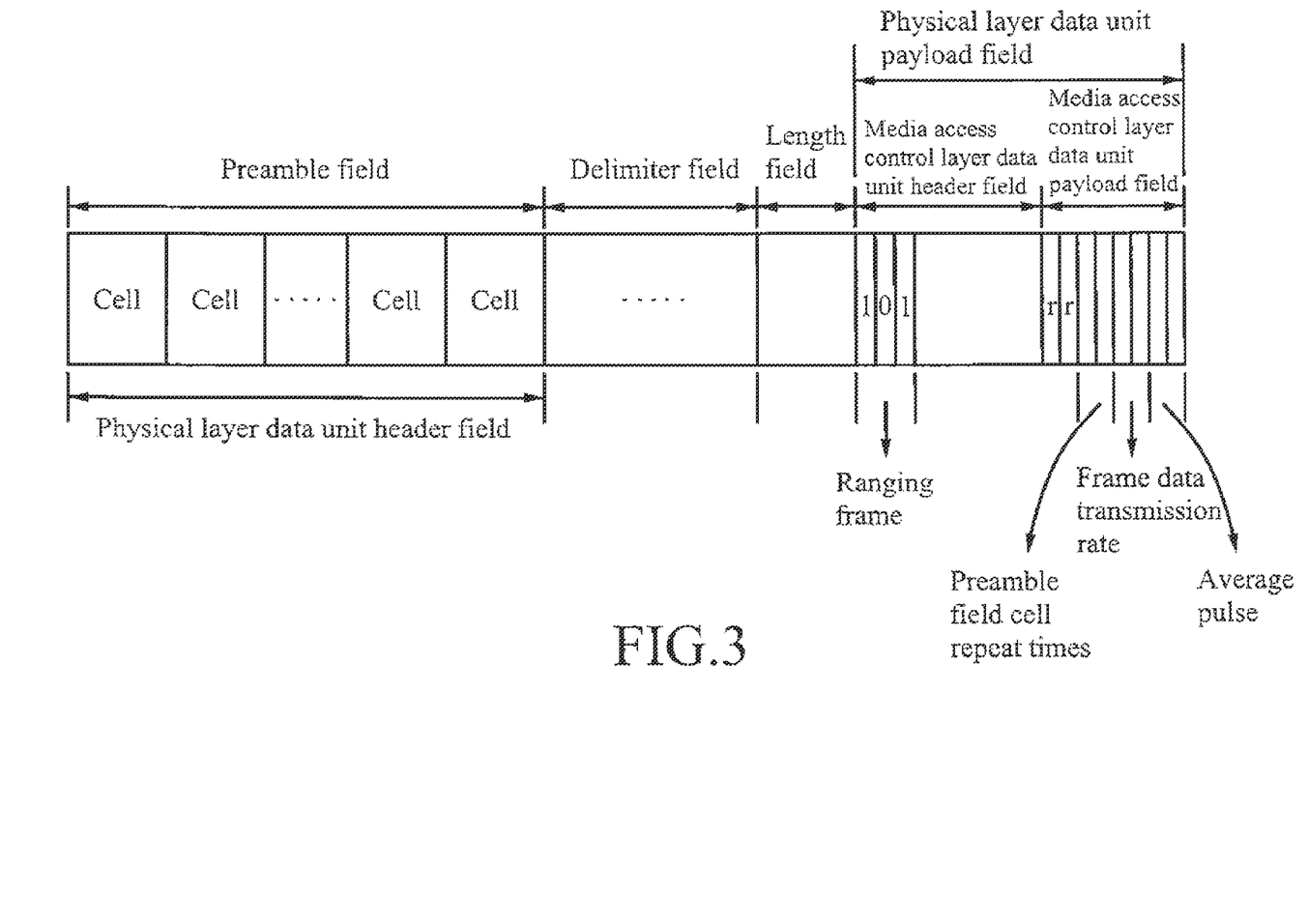
FIG. 3 is a structural diagram illustrating a ranging frame from the equipment node.
Figure 4:
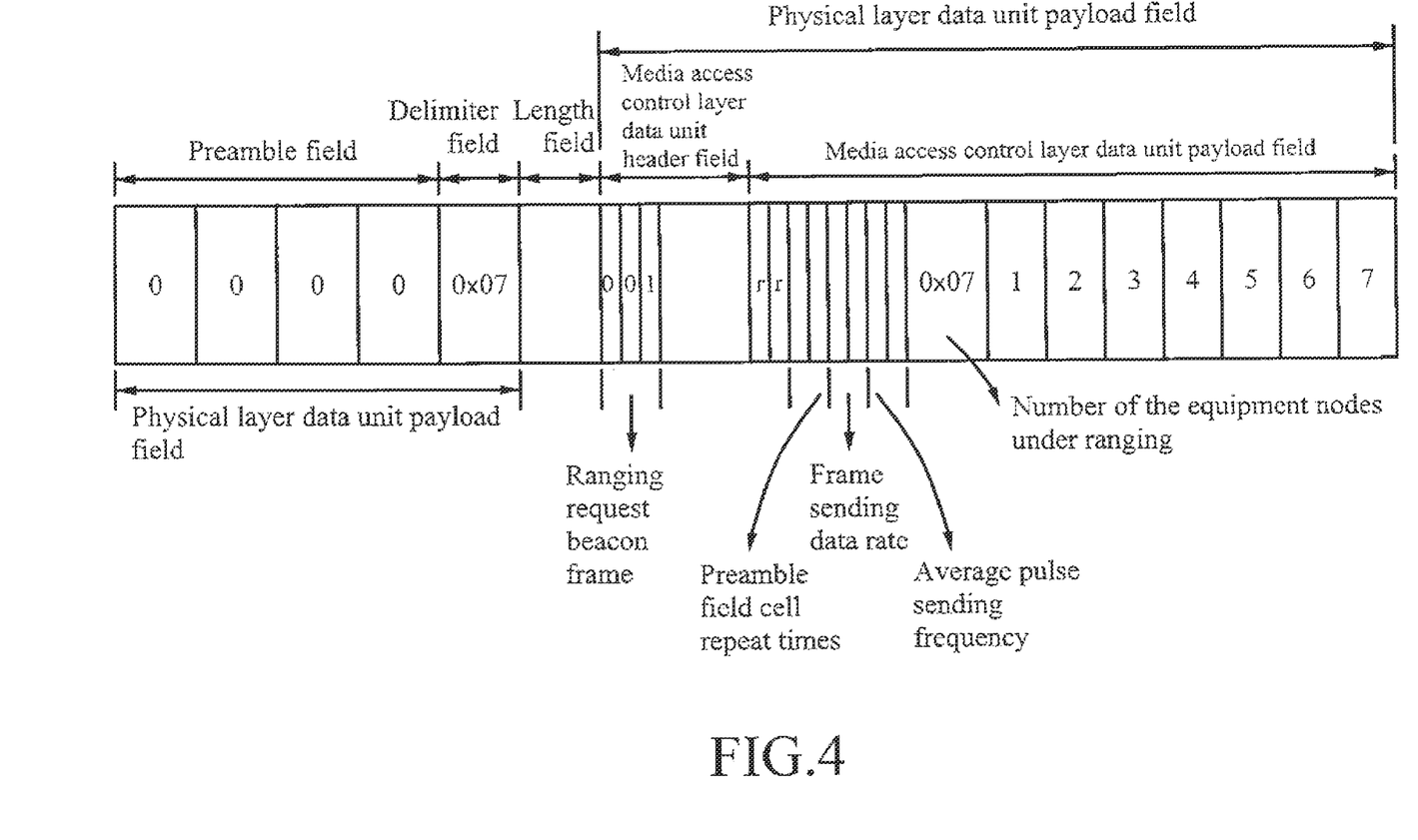
FIG. 4 is a structural diagram illustrating a ranging request beacon frame from the central node.

The relationship between the payload cell period and the frame sending data rate is illustrated in FIG. 4, and the relationship between the header field time and the preamble field cell repeat times is illustrated in FIG. 3.

TABLE 1

Relationship among payload cell period, data rate, and average pulse sending frequency (unit: nanosecond)

| Average pulse frequency(MHz) | Frame sending data rate (Mbps) | | | | |
|---|---|---|---|---|---|
| | 0.11 | 0.85 | 1.70 | 6.81 | 27.24 |
| 15.6 | 8205.13 | 1025.64 | N/A | 128.21 | 64.1 |
| 3.9 | 8205.13 | 1025.64 | 512.82 | 256.41 | N/A |

TABLE 2

Relationship among sending and arrival time of header field, average pulse sending frequency, and header field cell length (unit: microsecond)

| Average pulse frequency(MHz) | Header field cell length (piece) | | | | | |
|---|---|---|---|---|---|---|
| | 72 (64 + 8) | 1032 (1024 + 8) | 4104 (4096 + 8) | 128 (64 + 64) | 1088 (1024 + 64) | 4160 (4096 + 64) |
| 15.6 | 71.5 | 1025.4 | 4077.7 | 127.2 | 1081 | 4133.3 |
| 3.9 | 286.2 | 4101.5 | N/A | 319.5 | 4134.9 | N/A |

Note:
the last three columns aim for 0.11 Mpbs frame sending data rate status.

According to Tables 1 and 2, the average pulse sending frequency is 16 MHz, the preamble field cell repeat times are 1024 times, and the frame sending data rate is 0.85 Mbps, thus the time from sending to receiving a ranging frame equals to:

$$T_{Send\ to\ Receive} = (100/\text{speed of light}) \times 10^9 + 1025.4 \times 10^3 + 16400 + 96 \times \text{payload field cell time}$$

where 100 is the largest communication distance between the central node and the equipment node in a beacon wireless personal area network, and the unit is in meter.

According to IEEE802.15.4a international standard, a unit time slot equals to:

$$\begin{aligned}T_{Unit\ time\ slot} &= 60 \times \text{payload field cell period} \times \\&\quad 2^{network\ active\ period\ parameter} \\&\quad (0 < \text{network period parameter} < 15) \\&= 60 \times 1025.64 \times 2^{network\ active\ period\ parameter} \\&= 61538 \times 2^{network\ active\ period\ parameter}\ \text{nanosecond}\end{aligned}$$

What the central node needs to do is to select a proper network active period parameter based on the default average pulse sending frequency, the preamble field cell repeat times, and the frame sending data rate, to make the difference between the unit time slot and the time from sending to receiving the ranging frame positive and near to zero:

$$T_{unit\ time\ slot} - T_{send\ to\ receive} = 61538.4 \times 2^{network\ active\ period\ parameter} - 1140594.77 = 0$$

Thus, $2^{network\ active\ period\ parameter} = 18.54$, and the network active period parameter=5.

According to the above method, the relationship among the frame sending data rate, the header field length, the payload field cell period, and the network active period parameter are shown in Tables 3 and 4.

TABLE 3

SO value when average pulse sending frequency is 16 MHz

| Header field length(piece) | Frame sending data rate (Mbps) | | | |
|---|---|---|---|---|
| | 0.11 | 0.85 | 6.81 | 27.24 |
| 72 | N/A | 2(59.46 Ms) | 4(22.54 ms) | 5(28.7 Ms) |
| 1032 | N/A | 5(0.83 ms) | 8(0.91 ms) | 8(0.92 ms) |
| 4104 | N/A | 7(3.68 ms) | 10(3.77 ms) | 11(3.78 ms) |
| 128 | 1(53 ms) | N/A | N/A | N/A |
| 1088 | 2(83.8 ms) | N/A | N/A | N/A |
| 4196 | 4(2.82 ms) | N/A | N/A | N/A |

Note:
The number in parentheses is the difference between the unit time slot and the sending and receiving time, that is, spare time.

TABLE 4

SO value when average pulse sending frequency is 4 MHz

| Header field | Frame sending data rate (Mbps) | | | |
|---|---|---|---|---|
| length(piece) | 0.11 | 0.85 | 6.81 | 27.24 |
| 72 | N/A | 2(59.46 Ms) | 4(22.54 ms) | 5(28.7 Ms) |
| 1032 | N/A | 5(0.83 ms) | 8(0.91 ms) | 8(0.92 ms) |
| 4104 | N/A | 7(3.68 ms) | 10(3.77 ms) | 11(3.78 ms) |
| 128 | 1(53 ms) | N/A | N/A | N/A |
| 1088 | 2(83.8 ms) | N/A | N/A | N/A |
| 4196 | 4(2.82 ms) | N/A | N/A | N/A |

Note:
The number in parentheses is the difference between the unit time slot and the sending and receiving time, that is, spare time.

The network active period parameter of the beacon frame can not be larger than the beacon frame sending period parameter. If the two parameters are the same, and the network does not get into ranging state, then the whole network stays active because of the absence of an inactive period. In the present ranging method, the beacon frame sending period is set equal to the network active period parameter. After receiving the ranging request beacon frame, the equipment node without ranging in current active period, directly gets into dormancy state after two unit time slots until the next ranging request beacon frame comes. In this way, it saves energy and also guarantees that the central node is always in ranging operation without decreasing ranging efficiency.

The address information of all equipment nodes in the current beacon wireless personal network established by the central node are stored in a database of the central node. The central node selects the equipment nodes for ranging from the equipment address list, and stores the equipment addresses into a measuring address queue of the equipment nodes. Moreover, the number of the ranging times is also set by the central node at this time. Supposing that the number of the ranging times is n, then the central node can receive at most 2n ranging results from the equipment nodes (not guaranteeing receiving corresponding ranging frame in every unit time slot). More ranging times bring higher reliable result, but consume more network resource. Less ranging times bring less reliable result, and occupy less network resource. It is up to users. Generally speaking, more equipment nodes, less ranging times, and less equipment nodes, more ranging times.

After selecting the proper network active period parameter and the beacon sending period parameter for ranging, the central node prepares to send the ranging request beacon frame. The only identification of the ranging request beacon frame sent by the central node is the lowest three bits of the first byte in the payload field (the lowest three bits of the first byte of the media access control layer data unit header field). When the three bits are set to "100", it means that the current beacon frame is the ranging request beacon frame. Simultaneously, the central node in turn copies 16-bit short addresses and 64-bit long addresses (physical address) of at most seven equipment nodes (if the equipment nodes are less than 7, then copy all) totally 10 bytes from the measuring address queue to the media access control layer data unit payload field of the beacon frame. The address in the media access control layer data unit payload field is assigned as follows: the first byte contains the average pulse sending frequency, the preamble field repeat times and the frame sending data rate, the second byte is the number of addresses, and after that follows 70-byte addresses. The structural diagram of the ranging request beacon frame containing these information is illustrated in FIG. 4. The equipment node suitable for the $1^{st}$ address is assigned to the $1^{st}$ assigned time slot and occupies the $2^{nd}$ and $3^{rd}$ unit time slots. The equipment node suitable for the $2^{nd}$ address is assigned to the $2^{nd}$ assigned time slot and occupies the $4^{th}$ and $5^{th}$ unit time slots. Similarly, the equipment node suitable for the $7^{th}$ address is assigned to the $7^{th}$ assigned time slot and occupies the $14^{th}$ and $15^{th}$ unit time slots. The initial $0^{th}$ and $1^{st}$ unit time slots belong to public competition communication period, and perform other network operation when necessary.

After the ranging request beacon frame is set, the central node stores it in buffer and broadcasts the ranging request beacon frame in fixed time intervals (the fixed time interval is determined by the sending period parameter of the beacon frame).

When the equipment node receives the ranging request beacon frame, it reads the payload part of the beacon frame to check whether its equipment address exists. If not, the equipment node directly gets into dormancy state after 2 unit time slots until the next beacon frame comes. If a matching equipment address is found, the equipment node stores the ranging frame in buffer before the corresponding assigned time slot, and sends the ranging frame when the assigned time slot starts and sends the same ranging frame again in the $2^{nd}$ unit time slot of the current assigned time slot. After completing the sending of two ranging frames, the equipment node directly gets into dormancy state until the next beacon frame comes.

After the ranging request beacon frame is sent out, the timer of the central node starts working. The 32-bit timer works continuously until the whole ranging operation is over. When each unit time slot starts, the current value of the timer is recorded by snapshot. In the meantime, when the ranging frame sent by the equipment node is received, the current value of the time is also recorded by snapshot. The difference between the arrival time of the ranging frame and the initial value in the same unit time slot is the flight time of the ranging frame. The flight time is multiplied by the length of time that the timer jumped once, and the speed of light to get the distance between the equipment node and the central node. In the same assigned time slot, two effective timestamp reports (including initial value of the unit time slot, ranging frame arrival time, and the figure of merit value (FoM) of current snapshot of the timer) and the timestamp report are saved by the central node for analyzing ranging efficiency in the future.

When receiving each timestamp report, the central node preliminarily analyzes the obtained ranging result. If the arrival time of the ranging frame equals to the initial value of the unit time slot, then no ranging frame of the corresponding equipment node is received in the unit time slot, and the address of the equipment node is saved in the failure waiting queue.

When all assigned time slots are used, the central node copies the new addresses of seven equipment nodes from the measuring address queue to the payload field of the ranging request beacon frame.

After the addresses of all equipment nodes in the measuring address queue are measured, the central node starts a new round of ranging for these object equipment nodes. The round number equals to the preset ranging times.

When the ranging process is over (completing all rounds of ranging), the system assesses the ranging result of each of the equipment nodes, and the address of the equipment node failing in assessment is stored into the failure node queue. The assessment of the ranging result in each equipment node is mainly that of checking the current FoM of the timer in the result. If more than a certain number of times results (the certain number is determined by the ranging times) are lower than 70% (highest 90%, lowest 10%), then the ranging operation of the equipment node is determined to be a failure. The address of the failed equipment node is stored in the failure waiting queue.

Besides of their own faults, there are usually two reasons for equipment nodes to fail in a ranging operation. One is high speed of data transmission where more than 8 kinds of data rates are supported by IEEE802.15.4a and the lowest is 110 kbps and the highest is 27.24 Mbps. Exceedingly high data rate inhibits the ranging frame from being received before the unit time slot is over, and thus makes it unable to get enough 2n ranging values. Another reason is too little preamble field cell repeat times This causes the central node to obtain very low current FOM snapshot when the central node checks the arrival time of the ranging pulse (in a 802.15.4a standard, the ranging pulse is defined as the first pulse after the delimiter field ending). Finally for the equipment nodes in the failure node queue, the central node readjusts the network active period parameter and the beacon frame sending period, by appropriately reducing the data rate and increasing the preamble field cell repeat times (in a 802.15.4a standard, 64, 1024 and 4096 are provided for selection). That is to say, directly reduce the data rate for the equipment node that does not return enough ranging result times, directly increase the preamble field cell repeat times for equipment nodes that return enough ranging result times but with low FoM, and use both ways for the equipment node that does not satisfy both two points.

The central node copies the address of the equipment node in failure waiting queue to the measuring address queue until there is no equipment address in the failure waiting queue and the ranging operations of all nodes end.

In the present invention, high precise ranging is achieved by calculating the flight time of electromagnetic wave, equipment nodes that are temporarily not engaged in ranging operation will directly get into dormancy state, which greatly reduces the consumption of electric energy, as well as ranging efficiency is improved because of the proper arrangement of the time slots.

Compared with the traditional LQI energy method, the ranging method of the present invention has the following advantages:

Low cost. During ranging in a beacon wireless personal area network, the precision depends on the accuracy of the ranging timer and whether the system can capture the ranging pulse correctly. Thus a high hardware process ability of the nodes with ranging function is required. However, the present method only requires that the central node has a ranging function. Other equipment nodes are not required to have a ranging function, and can be common equipments. All the equipment nodes need to do is to sync up with the central mode.

High precision. The energy ranging method is suitable for local positioning, not for precise positioning. The present method can precisely measure the flight time of the ranging frame to calculate the distance between nodes. According to IEEE 802.15.4a standard, the unit of the ranging timer is 16 picoseconds, that is to say, the ranging precision is at the level of 4.8 millimeters.

Low power consumption. Power consumption is a problem that a beacon wireless personal area network cannot solve completely. In a beacon wireless personal area network, the active period mainly decides the life of the equipment, so the active period should be shortened depending on the function requirement (using lower active period parameter). The present method integrates the network resource management function in IEEE802.15.4b standard to estimate the sending and receiving time of the ranging frame via the frame sending data rate and the preamble field cell length. As such, the method can calculate more reasonable network active period parameter. Under the prerequisite of ensuring the sending and receiving of the ranging frame, the rest time of the unit time slot is shortened to the utmost in order to make the best use of the time resource of the time slot assigned to the equipment node, and thus save power. After receiving the ranging request beacon frame, the equipment node without ranging, can directly get into dormancy state after two unit time slots without waiting for the inactive period to start. The mechanism can substantially reduce the power consumption of the equipment nodes in the border district of the network.

High efficiency. The method provided by the present invention can measure seven equipment nodes and obtain fourteen ranging results at most. In the case of heavy network load, it can arrange the ranging queue reasonably to avoid communication impact. At the same time, it analyses and calculates the results of nodes that fail in ranging so as to provide more reasonable external conditions to those nodes in the next round of ranging circulation (reducing frame sending data rate and increasing preamble field cell repeat times) till reasonable ranging result of all equipment nodes are obtained.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A ranging method for measuring a distance between a central node and an equipment node in a beacon wireless personal area network, said ranging method comprising:
   (1) a central node of a beacon wireless personal area network calculating a network active period parameter in a ranging request beacon frame according to an initial value of a ranging parameter, and setting a beacon frame sending period parameter equal to the network active period parameter;
   (2) the central node copying an address of each of equipment nodes from an equipment address list into a measuring address queue;

(3) the central node copying the address from the measuring address queue into the ranging request beacon frame sent from the central node to the equipment nodes, and broadcasting the ranging request beacon frame to the equipment nodes, each of the equipment nodes in turn sending a ranging frame to the central node at an assigned time slot according to the address in the received ranging request beacon frame;

(4) if the central node receives the ranging frame at a unit time slot, the central node recording an arrival time of the ranging frame from the equipment node, and the central node copying a new equipment address from the measuring address queue into the ranging request beacon frame until the assigned time slots of the equipment nodes end;

(5) repeating steps (3) and (4) for completing a first ranging of each of the equipment nodes; and (6) calculating an average value of the arrival times, and getting the distance between the central node and the equipment node according to the average value and the initial value of the unit time slot corresponding to each of the arrival times.

2. The ranging method of claim 1, wherein, in step (6), the distance between the central node and the equipment node is calculated using the equation, the distance between the central node and the equipment node=(the average value of the arrival times−the initial value of the corresponding unit time slot)×speed of light 3. The ranging method of claim 1, wherein step (2) includes the sub-step of the central node setting a number of ranging times, said ranging method, after step (5) and prior to step (6), further comprising:

(5a) repeating steps (3) to (5) for completing a second ranging of each of the equipment nodes; and (5b) repeating the ranging wherein the number of the repetition is equal to the number of the ranging times set in step (2).

4. The ranging method of claim 3, wherein step (4) includes the sub-step of if the central node does not receive the ranging frame at the unit time slot, the central node storing the address of the equipment node corresponding to the unit time slot in a failure waiting queue, said ranging method, after step (5b) and prior to step (6), further comprising:

(5c) based on a reliability assessment of ranging results sent by a transceiver chip in the beacon wireless personal area network, the central node storing the address with a reliability lower than a preset threshold in the failure waiting queue, updating the ranging parameter in the ranging request beacon frame to get an updated network active period parameter and an updated beacon frame sending period parameter, copying the address in the failure waiting queue to the measuring address queue, and repeating steps (1) to (5b) until there is no address in the failure waiting queue to get the arrival times of the ranging frame of the equipment nodes.

5. The ranging method of claim 1, wherein:
the network active period parameter is calculated using the formula, the network active period parameter >

$$\text{Log}_2\left(\frac{T_{Send\ to\ Receive}}{60*\text{payload field signal period}}\right)$$

where the smallest natural number satisfying the formula is defined as the network active period parameter, and $$T_{Send\ to\ Recieve} = \frac{100}{\text{speed of light}} +$$
$$(\text{preamble field cell repeat times} + \text{delimiter field cell repeat times}) \times$$
$$\text{preamble field cell period} + \text{time of length field} +$$
$$\text{payload field cell length} \times \text{payload field cell period};$$

the preamble field cell period is the lasting time of a single cell in a preamble field in the ranging frame received by the central node from the equipment node;

the payload field cell period is the lasting time of a single cell in a payload field in the ranging frame;

the delimiter field is a part between the preamble field and the length field, including 8 or 64 preamble field cells; and the time of the length field is a fixed value.

6. The ranging method of claim 1, wherein:
the ranging request beacon frame sent from the central node to the equipment node includes a physical layer data unit header field, a physical layer data unit length field, and a physical layer data unit payload field;

the physical layer data unit payload field includes a media access control layer data unit header field, a media access control layer data unit payload field, and a media access control layer frame detection serial field;

in the media access control layer data unit header field, the lowest 3 bits of the $1^{st}$ byte set as 100 to define that the beacon frame is the ranging request beacon frame;

in the media access control layer data unit payload field, starting from the lowest bit, the $1^{st}$ and $2^{nd}$ bits of the $1^{st}$ byte store an average pulse sending frequency, the $3^{rd}$ and $4^{th}$ bits store a frame sending data rate, the $5^{th}$ and $6^{th}$ bits store a preamble field cell repeat times, the $7^{th}$ and $8^{th}$ are reserved, the $2^{nd}$ byte stores a number of the equipment address, the $3^{rd}$ to the $12^{th}$ bytes store the address of the first equipment node to be measured, the $13^{th}$ to the $22^{nd}$ bytes store the address of the second equipment node to be measured, and the $63^{rd}$ to the $72^{nd}$ bytes store the address of the seventh equipment node to be measured.

7. The ranging method of claim 1, wherein:
the structure of the ranging frame sent from the equipment node to the central node includes a physical layer data unit header field, a physical layer data unit length field, and a physical layer data unit payload field;

the physical layer data unit payload field includes a media access control layer data unit header field, a media access control layer data unit payload field, and a media access control layer frame detection serial field;

in the media access control layer data unit header field, the lowest 3 bits of the $1^{st}$ byte set as 101 to define that the data frame is a ranging frame, the media access control layer data unit payload field has one byte, the $1^{st}$ and $2^{nd}$ bits of the byte store an average pulse sending frequency, the $3^{rd}$ and $4^{th}$ bits store a frame sending data rate, the $5^{th}$ and $6^{th}$ bits store a preamble field cell repeat times, and the $7^{th}$ and $8^{th}$ are reserved.

* * * * *